Patented Feb. 14, 1933

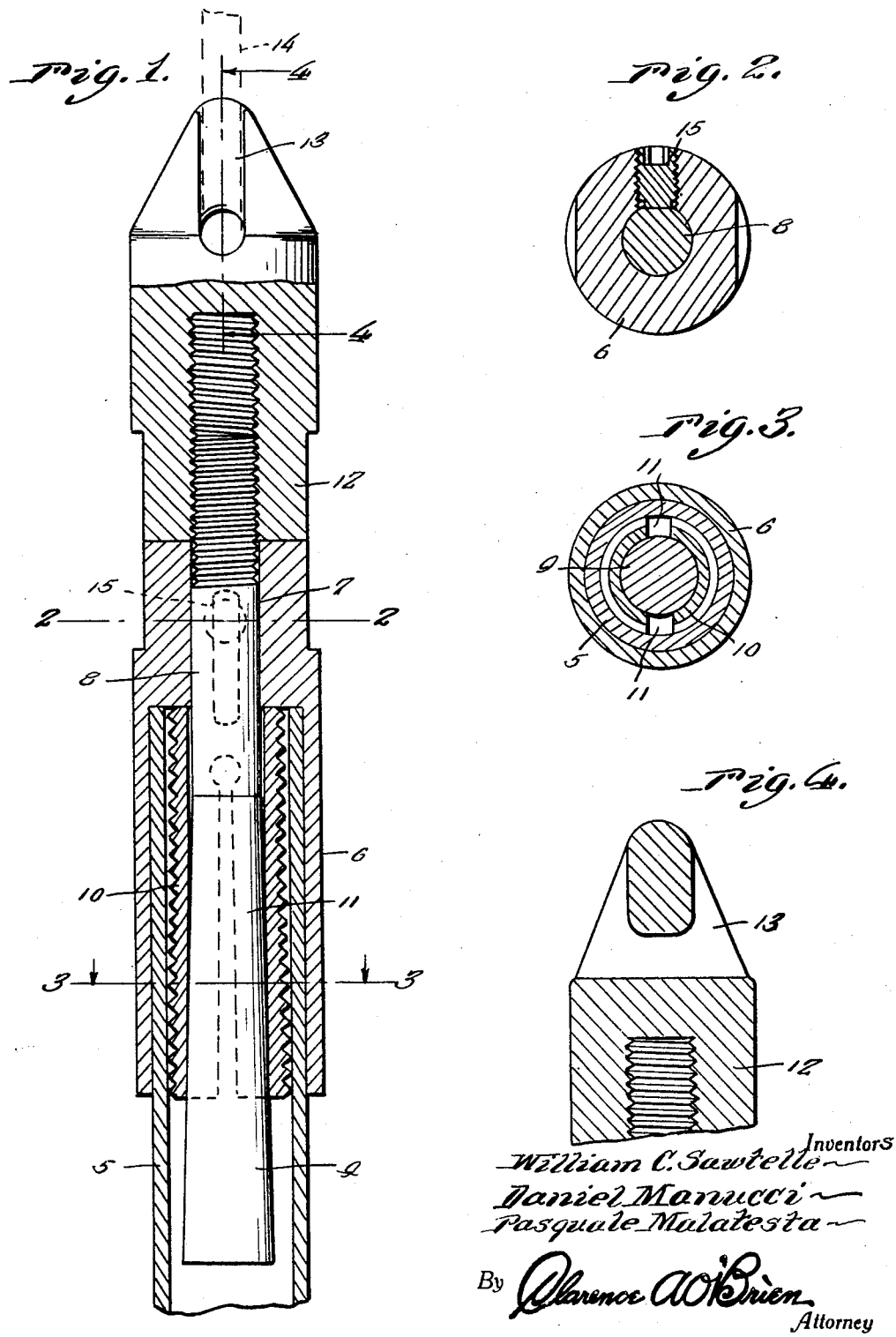

1,897,561

UNITED STATES PATENT OFFICE

DANIEL MANUCCI, PASQUALE MALATESTA, AND WILLIAM C. SAWTELLE, OF ERIE, PENNSYLVANIA

TUBE PULLER

Application filed February 15, 1932. Serial No. 593,088.

This invention relates to what may be termed a tube puller, the invention consisting in the provision of means to facilitate the installation or repairing of service mains.

In repairing water service lines from the street to the cellars of buildings, it is now the common practice to use a flexible copper service tube, and, as is also well known, in the replacing or installation of said service mains, to dig a ditch from the cellar to the street across the pavement all of which requires a great deal of work and is expensive.

It is, therefore, an important object of this invention to dispense with the necessity of providing a ditch when doing this work, and to facilitate and reduce the cost of the installation or repairing of a water service main.

To this end, the invention consists in improved means for removing the worn or broken service main and replacing it with a new one, the invention comprising a device for attaching a cable or the like to one end of the old main or pipe for removing it, and for attaching the cable to the new main or pipe for installing it, the operation requiring but a single hole to be dug adjacent the curbing in order to obtain access to the old main and cut the worn or damaged part of the main so that the said worn part can be removed in the manner above suggested.

The invention, together with its numerous objects and advantages will be best understood from a study of the following description taken in connection with the accompanying drawing wherein:

Figure 1 is a sectional elevational view through the tube puller, the same being shown applied to one end of the tube.

Figures 2 and 3 are transverse sectional views taken substantially on the lines 2—2 and 3—3 respectively of Figure 1.

Figure 4 is a sectional view taken substantially on the line 4—4 of Figure 1.

Referring more in detail to the drawing it will be seen that 5 designates generally one end portion of a tube, which latter may be in the nature of a flexible copper service tube employed in the installation or replacing of water service mains.

The improved tube puller comprises a cylindrical socket 6 that is adapted to engage over the end of the tube 5 in the manner shown. The upper end of the socket 6 is provided with an opening 7 for receiving a shank 8 that is provided with an elongated tapered sleeve-expanding head 9.

Arranged within the socket 6 and adapted to be expanded by the head 9 is an expansible gripping sleeve 10 that is provided with external threads or teeth for gripping the inner wall of the tube end 5, and is also split longitudinally as at 11 to permit of an expansion of the sleeve 10.

The free end of the shank 8 is provided with threads, and screwed onto this end of the shank 8 is a nut 12, which nut 12 is in the nature of a socketed body, internally threaded for screw-threaded engagement with said end of the shank 8, and at one end provided with an eye 13 whereby one end of a pulling cable or the like may be readily connected thereto, a portion of said cable being suggested by broken lines in Figure 1 and designated by the reference numeral 14.

With the parts as shown in Figure 1, it will be seen that the end 5 of the flexible tube has been inserted in the socket 6 in a manner to receive the sleeve 10. Obviously, by tightening the nut 12 shank 8 will be caused to move upwardly drawing the head 9 within the sleeve 10, causing the latter to be expanded and the teeth thereof to grip the interior of the pipe end 5 and secure said pipe end within the socket 6. With the sleeve 10 thus expanded, it will be apparent that the end 5 of the tube will be securely gripped between the sleeve 10 and the wall of the socket 6. With the device thus secured to the end of the tube, and the cable 14 connected with the eye 13, it is apparent that the tube may be pulled through the aperture or underground conduit, or may be readily raised or lowered depending upon the use to which the tube 5 is to be put.

To retain the shank 8 against rotative movement relative to the socket 6, there is screw-threadedly engaged with the wall of the socket at the upper end thereof, a set screw 15 that has its inner end arranged to engage a flat side of the shank 8 in the manner clearly suggested in Figure 2.

Even though we have herein shown and described the preferred embodiment of the invention, it is to be understood that the invention is susceptible of further changes, modifications, and improvements coming within the scope of the appended claims.

What is claimed is:

1. A tube puller comprising a socket, having an opening extending axially through the closed end thereof, an expansible sleeve arranged in the socket, a shank extending through the opening in the socket, and having on one end a head adapted to be drawn axially through the sleeve for expanding it, and on its other end being provided with threads, a nut threadedly engaged with the last named end of the shank, and an eye provided on one end of said nut.

2. A tube puller comprising a member provided with a socket, and having an axial opening at the closed end of the socket, a radially expansible member arranged in the socket and cooperable with the peripheral wall of the socket for clamping a tube therebetween, and means for expanding said expansible member comprising a shank having a tapered head adapted to be drawn through the expansible member, and a nut screwed on the shank for shifting it, together with inter-engaging means on the socket member and said shank for securing the latter against rotation relative to the socket member.

3. A device of the class described comprising a socket adapted to receive one end of a pipe, expansible pipe engaging means arranged in the socket, a shank shiftable axially through the socket and expansible pipe engaging means from the open to the closed end of the socket, and having a tapered end portion for expanding said pipe engaging means, and means for drawing said shank axially through the socket including means for connecting the shank with an operating cable or the like.

4. A device of the class described comprising a socket adapted to receive one end of a pipe, expansible pipe-engaging means arranged in the socket, a shank shiftable axially through the socket and expansible pipe engaging means from the open to the closed end of the socket, and having a tapered end portion for expanding said pipe engaging means, and means for drawing said shank axially through the socket including means for connecting the shank with an operating cable or the like, and comprising a socketing member having screw-threaded engagement with said shank, and provided at one end with an eye for receiving said cable.

In testimony whereof, we affix our signatures.

DANIEL MANUCCI.
PASQUALE MALATESTA.
WILLIAM C. SAWTELLE.